(12) United States Patent
Chen

(10) Patent No.: US 6,549,912 B1
(45) Date of Patent: Apr. 15, 2003

(54) LOYALTY FILE STRUCTURE FOR SMART CARD

(75) Inventor: Ann-Pin Chen, Foster City, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 09/159,266

(22) Filed: Sep. 23, 1998

(51) Int. Cl.⁷ .............................................. G06F 17/30

(52) U.S. Cl. ........................ 707/104; 707/10; 707/100; 705/41; 705/44

(58) Field of Search ............................ 707/100–104.1, 707/1, 9–10; 705/40–44, 26, 10–14; 714/12; 235/375, 380, 383

(56) References Cited

U.S. PATENT DOCUMENTS

| | | | | |
|---|---|---|---|---|
| 4,709,136 A | * | 11/1987 | Watanabe ..................... | 235/379 |
| 4,723,212 A | | 2/1988 | Mindrum et al. .............. | 705/14 |

(List continued on next page.)

FOREIGN PATENT DOCUMENTS

| | | |
|---|---|---|
| AU | 50312/96 | 10/1996 |
| AU | A-12267-97 | 7/1997 |
| EP | 0 373 036 B1 | 3/1995 |
| EP | 0 775 990 A2 | 5/1997 |
| EP | 0786746 | 7/1997 |
| GB | 2 274 349 A | 7/1994 |
| GB | 2 306 740 A | 5/1997 |
| WO | 95/21428 | 8/1995 |
| WO | 96/29668 | 9/1996 |
| WO | 96/31848 | 10/1996 |
| WO | WO 96/31848 | 10/1996 |
| WO | WO 97/05582 | 2/1997 |

OTHER PUBLICATIONS

Peter Lucas; Another Chance for Chip Cards–Smart—Credit Card Management, Sep. 1993.*

David Breitkopf, "CardSelect Tries Rewards Aggregation" Wednesday, Apr. 18, 2001.

Michelle Laque Johnson, *More Industries Are Rewarding Frequent Customers*, Jun. 26, 1991, Investor's Daily.

(List continued on next page.)

Primary Examiner—Jean M. Corrielus
Assistant Examiner—Jean Bolte Fleurantin
(74) Attorney, Agent, or Firm—Beyer Weaver & Thomas, LLP

(57) ABSTRACT

A loyalty file structure for a smart card includes any number of loyalty files preinstalled by a card manufacturer. Each loyalty file has a password, a file number, a label, an indicator of whether or not the file is currently being rented by a merchant, a length indicator, a data format indicator, and a data region. An issuer creates a unique password for each loyalty file on a card and then issues cards to customers. For customer enrollment at a point-of-sale, a merchant determines if a loyalty file is available. The merchant password is sent to the issuer on-line in real time and is returned along with authorization from the issuer to replace the password of the loyalty file with the merchant password. The file label is changed to a merchant identifier and the file is indicated as being rented. The merchant sends payment or a credit transaction to the issuer for use of the loyalty file. For use with a loyalty program, a merchant terminal finds the loyalty file of a customer's card for that merchant and reads or updates information within that file. The loyalty file on a card is also used with electronic ticketing to store information pertaining to a purchased ticket. Upon later presentation of the card at an airline boarding gate, stored information in the loyalty file is compared with the same information downloaded from the airline host computer. A match indicates a valid purchase and a boarding pass is issued.

12 Claims, 9 Drawing Sheets

U.S. PATENT DOCUMENTS

| | | | |
|---|---|---|---|
| 4,910,672 A | 3/1990 | Off et al. | 705/14 |
| 5,025,372 A | 6/1991 | Burton et al. | 705/14 |
| 5,056,019 A | 10/1991 | Schultz et al. | 705/14 |
| 5,173,851 A | 12/1992 | Off et al. | 705/14 |
| 5,297,205 A | 3/1994 | Audebert et al. | 380/251 |
| 5,530,232 A | 6/1996 | Taylor | 235/380 |
| 5,578,808 A | 11/1996 | Taylor | 235/380 |
| 5,613,912 A | 3/1997 | Slater | 463/25 |
| 5,649,118 A | 7/1997 | Carlisle et al. | 705/41 |
| 5,687,322 A | 11/1997 | Deaton et al. | 705/14 |
| 5,689,100 A | 11/1997 | Carrithers et al. | 235/380 |
| 5,721,768 A | 2/1998 | Stimson et al. | 379/114 |
| 5,721,781 A | 2/1998 | Deo et al. | 705/67 |
| 5,832,457 A | 11/1998 | O'Brien et al. | 705/14 |
| 6,105,008 A * | 8/2000 | Davis et al. | 705/41 |
| 6,247,129 B1 * | 6/2001 | Keathley et al. | 713/156 |
| 6,282,522 B1 * | 8/2001 | Davis et al. | 705/41 |
| 6,298,336 B1 * | 10/2001 | Davis et al. | 705/41 |

OTHER PUBLICATIONS

Mickey Meece, *GE's Rewards Card Grows in Shadow of Giants*, Mar. 17, 1994, The American Banker.

Mickey Meece, *Visa Introducing Reward Plan: 10–Cent Credit for Each Dollar*, Sep. 9, 1994, The American Banker.

Laura Gross, *Lessons for Banks In Frequent–Flyer Programs*, Aug. 4, 1996, The American Banker.

Michael Bliss, *Loyalty Cards, A New and Powerful Marketing Tool*, 1993, Lafferty Publications Ltd., ISBN 0 948394 68 4.

* cited by examiner

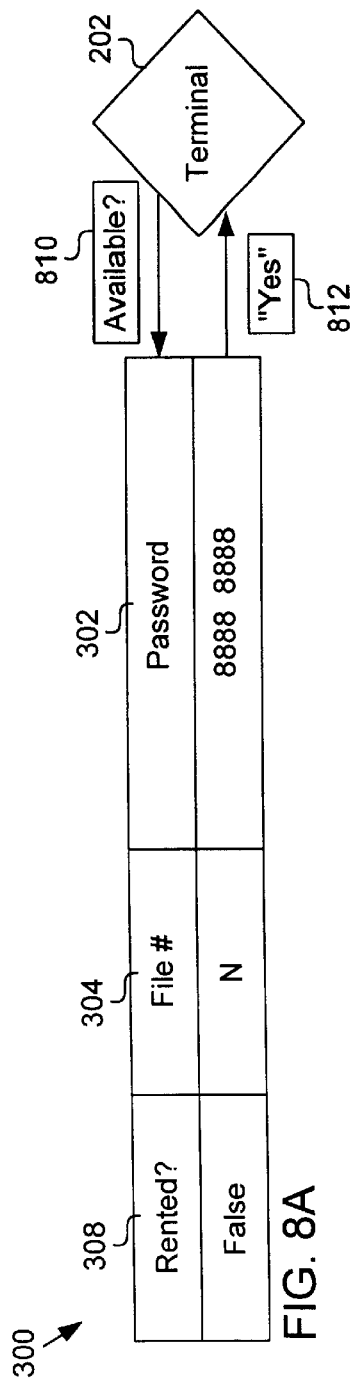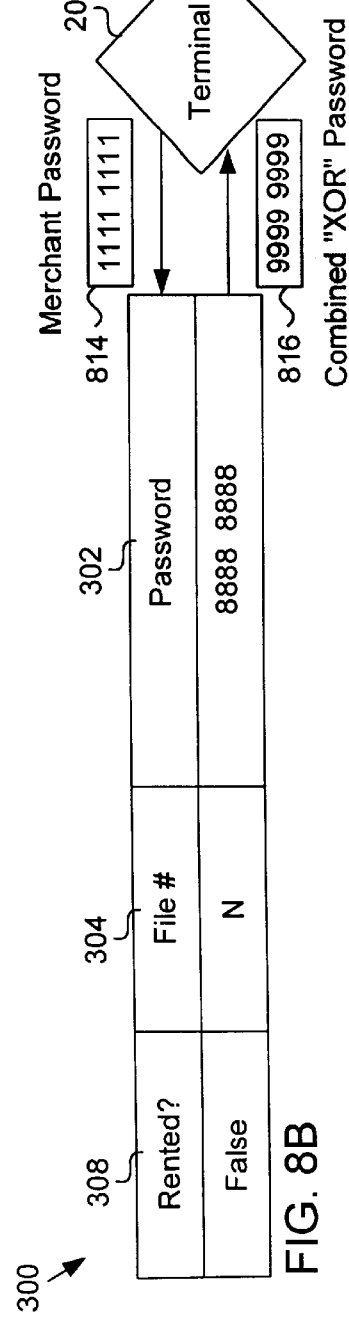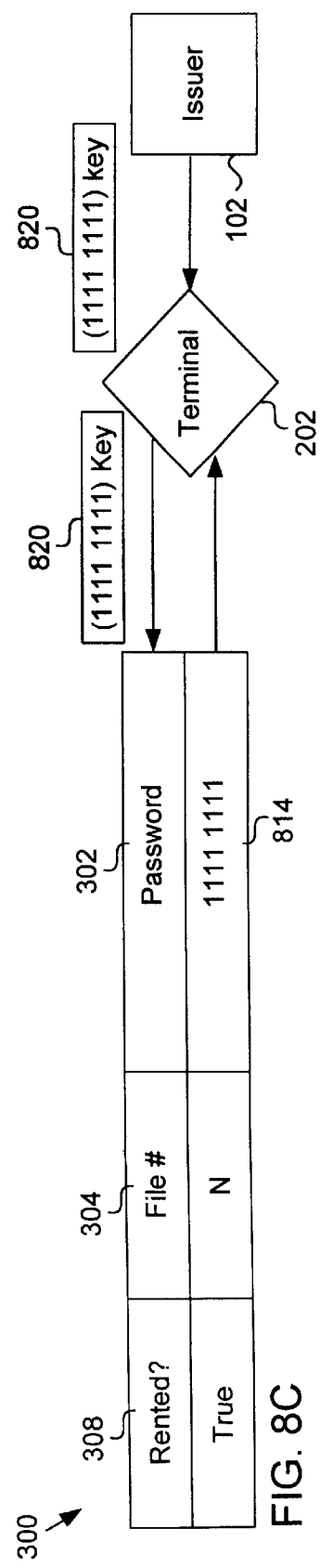

LOYALTY FILE STRUCTURE FOR SMART CARD

FIELD OF THE INVENTION

The present invention relate s generally to smart cards. More specifically, the present invention relates to implementation of a value-added file structure on smart cards.

BACKGROUND OF THE INVENTION

Many businesses currently make use of so-called "loyalty" programs that reward customers for frequent purchase of the business's products or services. Well known loyalty programs include frequent flyer mileage programs, frequent guest programs at hotels, programs to reward frequent purchases at food markets, etc. Many loyalty programs make use of a credit card-sized plastic card with an embossed customer number to help keep track of a customer's purchases. (Others even use smaller cards that may attach to a key chain.) Others use a magnetic stripe card which can magnetically store information such as customer name and identification number, number of purchases, points awarded, etc. Still other loyalty programs have been implemented using a smart card in conjunction with a terminal at a loyalty operator's place of business. Although some types of loyalty programs have been successfully implemented to date, there are a number of disadvantages with the way these programs are currently implemented.

For example, previous loyalty programs require fixed or preestablished relationships between a loyalty operator and an issuing bank. These previous programs have no flexibility and make it difficult for the loyalty operator to define and roll out new or improved loyalty applications. For one example, consider a large market chain that wishes to develop a loyalty program for its food stores in conjunction with a regional bank. The market must first negotiate an agreement with the bank to provide a particular loyalty file structure on a smart card (or magnetic stripe card), along with a set of available commands that the loyalty operator's terminal can execute in the course of implementing the loyalty application. The market must specify a particular file structure with which its own loyalty application software an work. The market must then write its loyalty application software to work in conjunction with the file structure and commands it has specified to be present on the card to be issued by the regional bank. All of this negotiation and specification takes a great deal of time and money. In fact, once an issuing bank specifies a particular file structure and interface for a loyalty application for use with a smart card, it can take up to nine months for the integrated circuits to be manufactured, embedded in smart cards, and finally returned to the bank for issuance to customers.

Further compounding the problem is that the large market chain would like to have any and all of its customers take part in its new loyalty program and not necessarily just those customers who have smart cards issued from the regional bank. It would not be feasible for the market to negotiate with each and every bank issuing a smart card that may appear one day in one of its markets. The market would like to be able to accept any smart card used by one of its customers and have that customer enrolled in the market's loyalty program regardless of which bank the customer uses.

Consider a customer who uses a smart card issued by a large eastern bank because that is the bank that also provides the customer with frequent flyer mileage for his or her airline of choice. Even though the customer lives and shops in California, it is unlikely that any of the businesses he or she patronizes would have set up a loyalty program with the large eastern bank because that bank is out of the area. It is more likely that the California business will have negotiated with local banks to produce a custom loyalty file structure on a smart card that those businesses can make use to implement a loyalty program. Of course, it is possible that each customer could maintain a collection of smart cards from different banks that would allow that customer to enroll in the loyalty programs of any number of businesses. Realistically, though, customers will balk at the idea of carrying a large number of cards simply in order to take part in many loyalty programs.

Therefore, a technique is desired that would allow loyalty operators to enroll customers having smart cards from any issuer in that loyalty operator's loyalty program without the need for a prearranged, fixed relationship with any issuer. It would further be desirable for an issuer to be able to generate revenue from loyalty programs implemented on smart cards issued by the issuer, yet relieve the issuer from having to negotiate agreements or from having to design custom loyalty file structures. Such a technique would further allow a loyalty operator to flexibly define their own loyalty program and to implement loyalty application software to its own liking.

SUMMARY OF THE INVENTION

To achieve the foregoing, and in accordance with the purpose of the present invention, a loyalty file structure for smart cards is disclosed that obviates the need for predetermined, prearranged agreements between card issuers and loyalty operators.

The present invention allows flexibility in implementing loyalty programs by a loyalty operator and eliminates the need to have custom prearranged file structure definitions between a loyalty operator and each card issuer. A loyalty operator no longer needs to negotiate an agreement with each and every single issuer in order to have the issuer's card accepted in the loyalty program of the operator, i.e., a smart card need not be custom made for each loyalty program.

The present invention provides numerous advantages and features. By providing any number of loyalty files on a smart card, a loyalty operator is able to enroll a customer in their loyalty program regardless of the bank from which the card was issued. Loyalty operators can define their own loyalty application software and determine their own level of security needed, without having to predefine a security level before the card is issued. A loyalty operator is also allowed access to a loyalty file on a smart card in real time, thus permitting a customer to be enrolled and data to be transferred to or from the card while the customer is waiting. A loyalty operator can also choose their own password for access to a file and can decide their own level of security needed for a particular file. Furthermore, no key exchange is required between the parties.

The present invention also provides numerous advantages from the issuer's point of view. By allowing access to a loyalty file on a smart card in real time over an on-line connection, the issuer can make loyalty files available for rent easily and quickly, thus generating revenue from all of its cards issued, regardless of the geographic location of the cardholder or the loyalty operator. Furthermore, the issuing bank is relieved from having to either specify a custom loyalty file structure implementation on a smart card and/or having to negotiate agreements with each and every loyalty operator.

In one embodiment of the present invention, any number of loyalty files with standard header information and variables are implemented in a memory of a smart card before the smart card is issued to a customer. The structure of a loyalty file and the basic commands used to interface with the loyalty file are known beforehand by the smart card issuers, by acquiring banks, and by loyalty operators that are developing loyalty application software. When a customer uses a smart card in conjunction with a merchant, the merchant terminal determines whether a loyalty file is available for use. If so, the terminal is able to go on-line in real time to communicate with the issuer to receive a password to allow access to the selected loyalty file and other identifying information. In this fashion, the issuer can keep control over the use of particular loyalty files on smart cards and keep track of which loyalty operators have enrolled which customers in loyalty programs. The loyalty file on the smart card is made available for use by the loyalty application software of the loyalty operator and in exchange, the loyalty operator makes a payment to the issuer. From this point on, the loyalty operator makes use of its own loyalty application software to read from and/or write to the loyalty file on the smart card any data it desires.

In another embodiment, a loyalty file on a card is used with electronic ticketing to store information pertaining to a purchased ticket over the Internet. Upon later presentation of the card at an airline boarding gate, stored information in the loyalty file is compared with the same information downloaded from the airline host computer. A match indicates a valid purchase and a boarding pass is issued.

BRIEF DESCRIPTION OF THE DRAWINGS

The invention, together with further advantages thereof, may best be understood by reference to the following description taken in conjunction with the accompanying drawings in which:

FIG. 8A illustrates a query from a terminal to a loyalty file as to whether that particular file is available for use by the merchant.

FIG. 8B illustrates the transfer of a loyalty operator password from a terminal to a card.

FIG. 8C illustrates an encrypted password being passed back to a loyalty file in a card via a terminal.

DETAILED DESCRIPTION OF THE INVENTION

Figure 1:
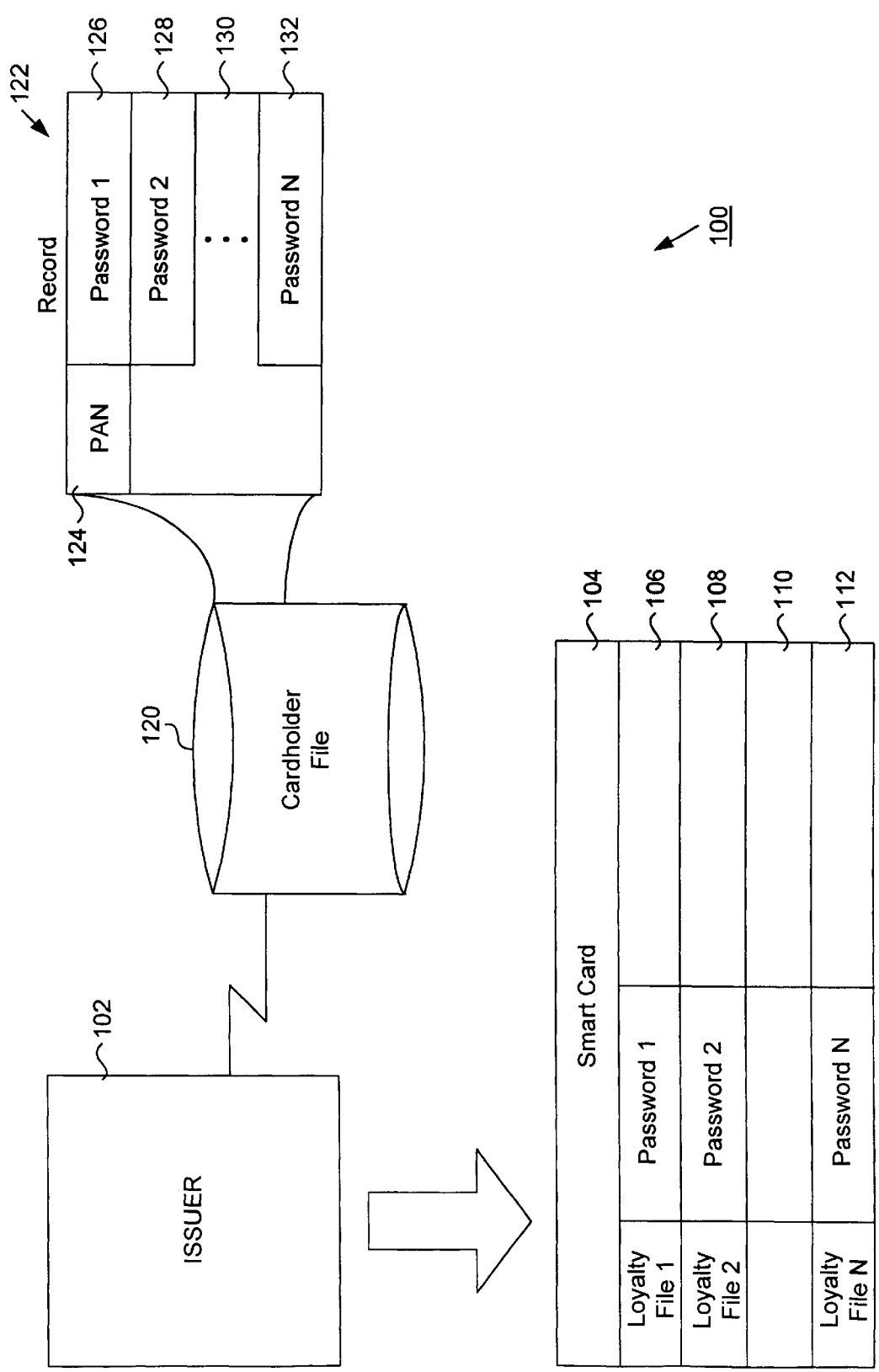
FIG. 1 illustrates a card issuance scenario according to one embodiment of the present invention.

In one particular embodiment of the present invention, a file structure is implemented on a smart card in such a way as to improve implementation of a loyalty program by a merchant. In a broader sense, the improved file structure of the present invention is applicable not only to loyalty programs, but to virtually any situation in which a merchant or other entity desires to rent, lease, control, or otherwise make use of a file on a smart card access to which is initially controlled by the issuer of the smart card. As used herein, "loyalty" refers not only to those traditional loyalty programs that have been implemented, but also to any situation in which a merchant or other entity desires to make use of the file structure of the present invention. In this sense, the present invention provides a value-added file structure. One such embodiment for ticket purchase confirmation is presented below, and other embodiments are also described. To illustrate one possible use of the invention, use of a rented file in a loyalty program of a merchant will be described below in detail.

Smart Cards

The present invention is applicable to smart cards. Also termed chip cards, integrated circuit cards, memory cards or processor cards, a smart card is typically a credit card-sized plastic card that includes one or more semiconductor integrated circuits. The smart card may be programmed with various types of functionality such as a stored-value application, a credit or debit application, a loyalty application, cardholder information, etc. Although a plastic card is currently the medium of choice for smart cards, it is contemplated that a smart card may also be implemented in a smaller form factor, for example, it may attach to a key chain or be as small as a chip module. A smart card may also be implemented as part of a personal digital assistant, telephone, or take a different form. The below description provides an example of the possible elements of a smart card, although the present invention is applicable to a wide range of types of smart cards.

A smart card may include a microprocessor, random access memory (RAM), read-only memory (ROM), non-volatile memory, an encryption module (or arithmetic unit), and a card reader (or terminal) interface. Other features may be present such as optical storage, flash EEPROM, FRAM, a clock, a random number generator, interrupt control, control logic, a charge pump, power connections, and interface contacts that allow the card to communicate with the outside world. Of course, a smart card may be implemented in many ways, and need not necessarily include a microprocessor or other features.

The microprocessor is any suitable central processing unit for executing commands and controlling the device. RAM serves as temporary storage for calculated results and as stack memory. ROM stores the operating system, fixed data, standard routines, look up tables and other permanent information. Non-volatile memory (such as EPROM or EEPROM) serves to store information that must not be lost when the card is disconnected from a power source, but that must also be alterable to accommodate data specific to individual cards or changes possible over the card lifetime. This information includes a card identification number, a personal identification number, authorization levels, cash balances, credit limits, and other information that may need to change over time. An encryption module is an optional hardware module used for performing a variety of encryption algorithms. Of course, encryption may also be performed in software. *Applied Cryptography,* Bruce Schneier, John Wiley & Sons, Inc., 1996 discusses suitable encryption algorithms and is hereby incorporated by reference.

The card reader interface includes the software and hardware necessary for communication with the outside world. A wide variety of interfaces are possible. By way of example, the interface may provide a contact interface, a close-coupled interface, a remote-coupled interface, or a variety of other interfaces. With a contact interface, signals from the integrated circuit are routed to a number of metal contacts on the outside of the card which come in physical contact with similar contacts of a card reader device. A smart card may include a traditional magnetic stripe to provide compatibility with traditional card reader devices and applications, and may also provide a copy of the magnetic stripe information within the integrated circuit itself for compatibility.

Various mechanical and electrical characteristics of a smart card and aspects of its interaction with a card reader device are described in *Smart Card Handbook,* W. Rankl and W. Effing, John Wiley & Sons, Ltd., 1997, and are defined by the following specifications, all of which are herein incorporated by reference: Visa Integrated Circuit Card Specification, EMV Integrated Circuit Card Specification for Payment Systems, EMV Integrated Circuit Card Terminal Specification for Payment Systems, EMV Integrated Circuit Card Application Specification for Payment Systems, Visa International Service Association 1996; and International Standard; Identification Cards—Integrated Circuit(s) Cards with Contacts, Parts 1–6, International Standards Organization 1987–1995.

Overview

The recent advent of smart cards has made it possible for larger amounts of data to be stored on a card and for the card to perform more sophisticated processing. It is realized that smart cards provide many advantages to merchants, customers and issuers: faster and more secure transactions, value added services present on the card, the ability to implement a variety of applications, etc. Embodiments of the present invention can make use of these and other advantages provided by smart cards through the use of an improved loyalty file structure.

FIG. 1 illustrates a card issuance scenario according to one embodiment of the present invention. In this embodiment, an issuer 102 issues a smart card 104 to a customer that contains a loyalty file structure according to an embodiment of the invention. Issuer 102 may be any suitable issuing entity such as a bank, financial institution, a service association, a merchant or other organization, or even an agent acting for an issuer. Smart card 104 includes any number of loyalty files 106–112, each associated with its own password. Although each password may be the same for each loyalty file on a given smart card, preferably each password is distinct for every loyalty file of a smart card. When a customer uses smart card 104 in conjunction with a loyalty operator's business, a particular loyalty file will be used to implement an embodiment of the invention. As used herein, a loyalty operator may be any merchant, company, business, individual or similar type entity that desires to implement a loyalty program for its customers or other entities with which it performs transactions. The below description often uses the term "merchant" for ease of explanation.

Cardholder file 120 is any suitable database file such as are known in the art for containing records of information pertaining to each cardholder to which issuer 102 has issued cards. For example, cardholder record 122 illustrates a portion of a record for a particular cardholder found in file 120. Shown associated with the cardholder's primary account number (PAN) are passwords 126–132 that correspond to the passwords stored in conjunction with loyalty files 106–112 on smart card 104.

Passwords may be generated by the issuer for particular loyalty files on a smart card in a wide variety of manners. In one embodiment of the invention, a password is derived for a particular loyalty file using the cardholder's PAN and a unique number corresponding to the loyalty file. In this manner, a unique password is generated for each loyalty file. Because a password for a given file can be derived from the PAN, the issuer need not necessarily store the passwords in a cardholder record. Of course, an issuer may store passwords if desired, or may generate them when needed. Advantageously, having passwords associated with loyalty files that are generated by, and only known to, the issuer allows an issuer to retain control over the use of a particular loyalty file. Such control allows an issuer to rent, lease, or otherwise derive revenue from a loyalty file when used as part of a loyalty operator's loyalty program. For convenience, throughout this disclosure such rental, leasing or other use of a loyalty file will be referred to generically as "renting" the file.

Figure 2A:
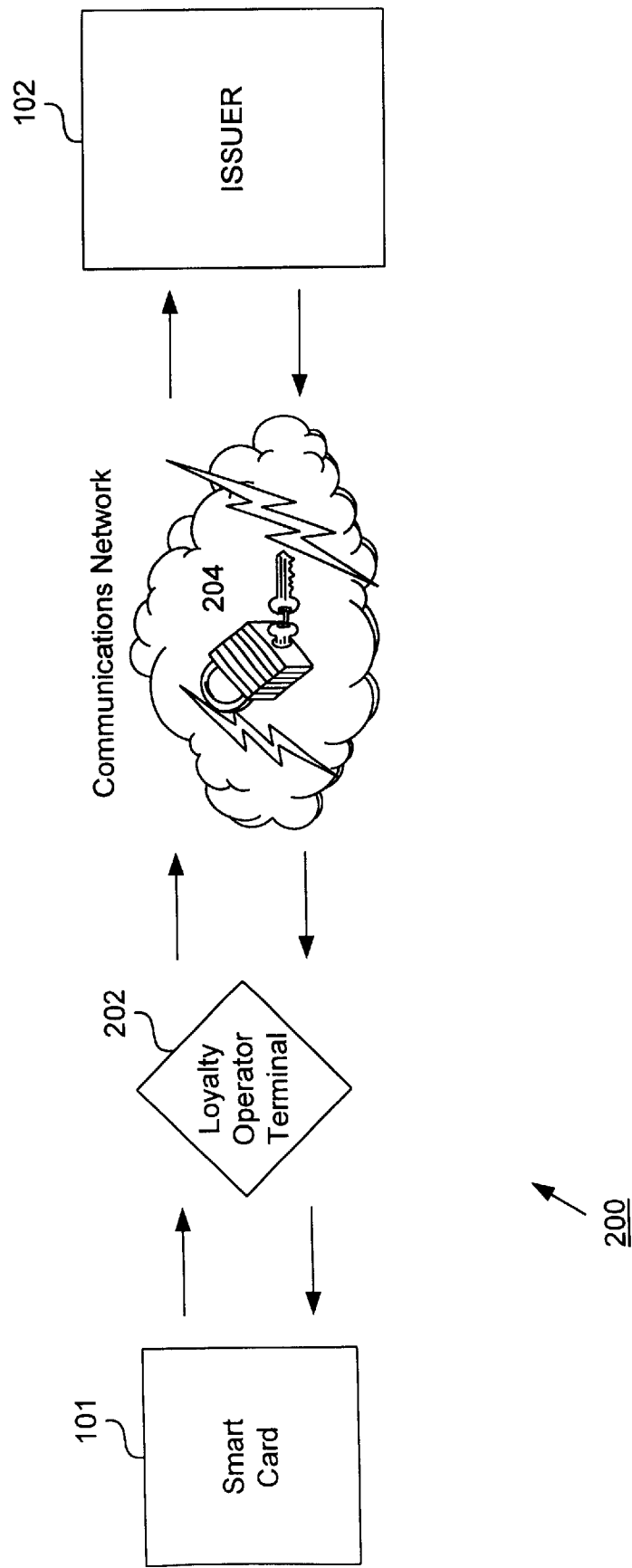
FIG. 2A illustrates symbolically the flow of information within a loyalty program implementation system when a smart card is presented to a merchant for the first time before the customer is enrolled.

FIG. 2A illustrates symbolically the flow of information within a loyalty program implementation system 200 when a smart card 104 is presented to a merchant for the first time and the cardholder is not yet enrolled in the merchant's loyalty program. Information is transmitted from smart card 104 through a loyalty operator terminal 202 via a communications network 204 to issuer 102.

Terminal 202 may be any suitable terminal such as are known in the art for reading from, and writing to, a magnetic stripe card, a smart card, or the like. By way of example, terminal 202 is a terminal manufactured by Verifone, Hypercom, NCR, or other manufacturer that produces a similar terminal. An example of a terminal 202 is provided in FIG. 2B. For ease of explanation, the below description will discuss use of the invention with a merchant terminal.

Communications network 204 may be any suitable communications network that allows communication between a merchant terminal and issuer 102. For example, communication via media such as telephone lines, cable, fiber optic, microwave, satellite, etc., may be used. Existing networks such as ATM networks, the Internet or propriety networks may be used. In one embodiment of the invention, network 204 is implemented using VisaNet, an existing global clearing and settlement system provided by Visa International Service Association (Visa International) of Foster City, Calif.

When smart card 104 is used in merchant terminal 202 it may be that the cardholder is not enrolled in the merchant's loyalty program. If the customer would like to enroll in the loyalty program, a request from the merchant is transmitted from terminal 202 to issuer 102 which then prepares appropriate information and commands to allow the merchant to begin renting a particular loyalty file 106 on card 104. This information and commands are then sent back from issuer 102 to merchant terminal 202 and eventually to card 104. At this point, the cardholder possessing card 104 is able to take advantage of the merchant's loyalty program using loyalty file 106 on card 104 that has just been assigned. In one embodiment of the invention, in conjunction with this interchange (or sometime soon thereafter, or even beforehand), the merchant makes a payment to issuer 102 for the right to rent and make use of a particular loyalty file on card 104. Preferably, the loyalty file is for the exclusive use of the merchant's loyalty program. In this fashion, a merchant is able to make use of a loyalty file on a customer's card in real time, and the issuer is able to receive payment for making such a loyalty file available. Furthermore, these loyalty files awaiting use may be present on any type of smart card issued by any bank or financial institution, and there is no need for the merchant or the issuer to jointly specify a loyalty file structure or to negotiate an agreement beforehand. In other embodiments, no fee for rental is required, or other rental terms may be used.

Figure 2B:
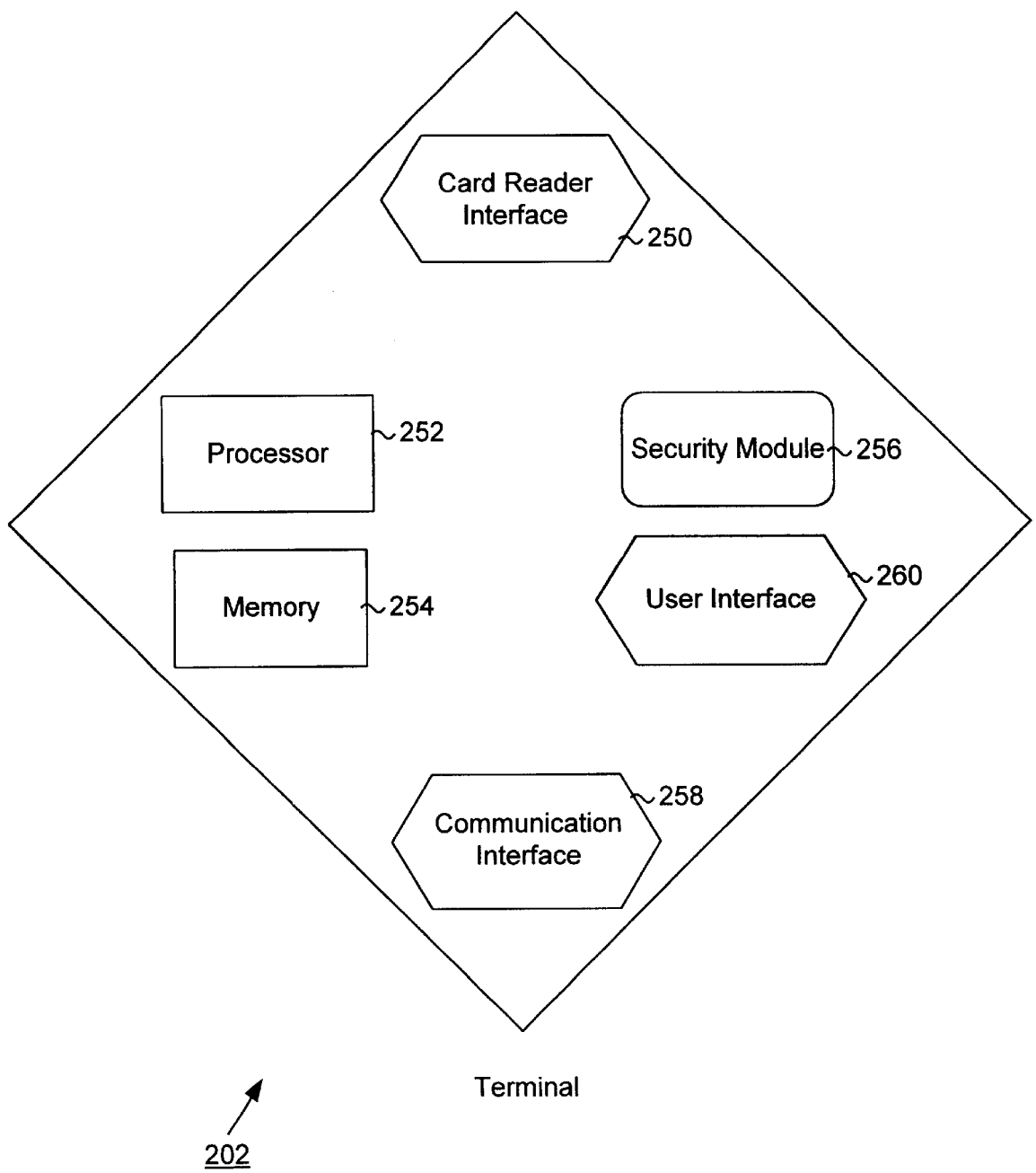
FIG. 2B illustrates an example of a terminal.

FIG. 2B illustrates an example of a terminal 202 suitable for use with an embodiment of the present invention. In general, the present invention is applicable for use with a wide variety of terminals. Also termed interface device (IFD), chip-accepting device (CAD), chip card reader (CCR), smart card adapter and card reader device, a terminal may be any suitable interface device that functions to transfer information and commands between a smart card and a user and/or a computing device. A terminal may also interface to a magnetic stripe card. A terminal may be a non-intelligent device that simply provides power to a card and facilitates the transfer of information, or may be as complex as a merchant terminal that includes a processor, application software, and the ability to communicate over a network.

Terminal 202 includes a card reader interface 250, a processor 252, a memory 254, a security module 256, a communication interface 258 and an optional user interface 260. Card reader interface 250 accepts an inserted smart card and provides electrical connection from the terminal to the card contacts. For those contactless cards, interface 250 provides communication between the card and terminal using other techniques. Processor 252 may be a simple microprocessor or a single-chip computer. Processor 252 controls card reader interface 250, administers user interface 260, establishes a connection to a higher level system, and in general controls operation of terminal 202. Memory 254 may be any suitable type of memory such as RAM, ROM and EEPROM, and preferably stores loyalty application software that implements the merchant's loyalty program. Optional security module 256 contains keys used in encryption algorithms and is typically mechanically and electrically separate from the rest of terminal 202. Module 256 may be a single-chip computer in a protective housing or even a smart card. Communication interface 258 may include an electrical or optical connection to a local computer, or telephone connection via a modem (or cellular) to a remote server computer. Interface 258 may also be implemented using other technologies such as microwave, radio, infrared, etc. User interface 260 includes a keyboard and display screen. Terminal 202 may also include a real-time clock.

A terminal may take any of a variety of physical forms such as a stand alone unit, integrated with a computer, attached to the keyboard of a computer, a PCMCIA card, or even built in to a floppy disk-sized unit capable of being read from a disk drive of a computer, etc. Furthermore, a terminal may also be embodied in any portable device such as a laptop computer, a cellular telephone, or any variety of a personal digital assistant (PDA) such as those made by Apple Computer, Inc., U.S. Robotics or 3Com.

Loyalty File Example

Figures 3, 4:
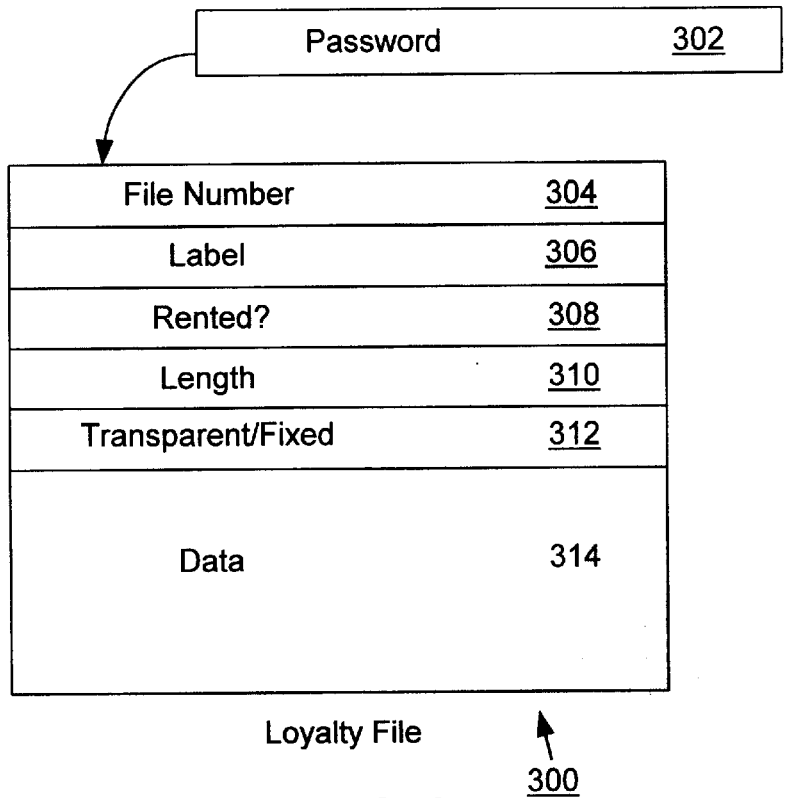
FIG. 3 illustrates an example of a loyalty file suitable for use with one particular embodiment of the present invention.
FIG. 4 illustrates one particular example of the type of data that may be stored within a loyalty file.

FIG. 3 illustrates an example of a loyalty file 300 suitable for use with one particular embodiment of the present invention. Loyalty file 300 is one example of how a file may look; those of skill in the art will appreciate that such a file may be organized in a number of different ways. For example, a particular loyalty file may be partitioned in any fashion by the loyalty program operator and may have any number of variables and/or attributes associated with it. Furthermore, each loyalty file may store variables directly within the file or may store these variables in a separate location so long as the variables are still associated with the file.

Associated with loyalty file 300 is a password 302 that is preferably initially supplied by the issuer. Although password 302 may be directly stored within file 300, in one embodiment it is preferable if password 302 is stored in a separate location yet is still associated with loyalty file 300. Included within loyalty file 300 are a file number 304, a label 306, a Boolean flag Rented? 308, a length 310, a transparent/fixed variable 312 and a data region 314.

File number 304 is any suitable number or identifier that helps to distinguish one loyalty file from another on a given smart card. By way of example, file number 304 may be one of a sequential series of numbers for loyalty files on a smart card. For example, if there are ten loyalty files on a smart card, these files could be numbered 1–10. Label 306 is an identifier that helps to identify the merchant who has rented a particular loyalty file. For example, should the market chain Safeway rent a loyalty file on a smart card, label 306 would be replaced by the word "Safeway," a unique identifier for that merchant, a secret code that is known only to the merchant, or any other suitable identifier for that merchant.

The Boolean flag Rented? 308 indicates whether or not this particular loyalty file 300 has been rented by a merchant and is being exclusively used by the loyalty program of that merchant. Alternatively, multiple merchants and/or loyalty operators may arrange so that more than one merchant may have access to a file, and a suitable variable would indicate this situation. One merchant or loyalty operator may also rent more than one file. Length 310 indicates the total length in bytes, words, bits, or other suitable unit of loyalty file 300. In other embodiments, length 310 indicates the length of the header information preceding data in the file, indicates the length of data only, or indicates the length of another suitable portion of the file.

Transparent/fixed variable 312 indicates whether the file is organized in a transparent or fixed format. As is known in the art, files on smart cards are generally implemented in either a transparent or a fixed format. Under a transparent format, software that is reading from, or writing to, a file needs to know the name of the file, a displacement within the file, and length of data to be able to accurately find or write information. Under a fixed format, files are organized using records; thus software reading from, or writing to, a fixed file needs to know the file name and the record within the file from which data will be read or to which data will be written. It should be appreciated that other file formats may also be used and variable 312 may indicate any of a variety of formats. Although a number of specific variables have been illustrated in conjunction with loyalty file 300, it should be appreciated that any number of other variables may also be used in conjunction with file 300 to assist in implementing the invention, or that fewer variables may be needed or modifications of these variables may be introduced.

FIG. 4 illustrates one particular example of the type of data that may be stored within a loyalty file. Data section 314 of file 300 may include a wide variety of information pertaining to the cardholder, any number of merchants, purchasing history, etc. By way of example, data section 314 includes: a loyalty number 402 indicating to a merchant's loyalty program the identification of a particular customer; name of customer 404; age of customer 406; and gender of customer 408. Of course, not all of this information need be present and it is entirely possible that a great deal of other customer and marketing-type information may be included within file 300. Also included within file 300 is a variety of information pertaining to a customer's habits with a particular merchant. For example, file 300 may also include: number of visits 410; a list 412 of what a customer purchases (i.e., shopping habits); the number of points 414 a customer has accumulated (such as frequent flyer miles, number of nights stayed at a hotel, etc.); an award counter 416 indicating a potential award that the customer has accumulated; preferences 420 indicating customer preferences with regard to a particular product or service of the merchant; and a credit value 422 indicating a credit the customer has with a particular merchant.

For those merchants which sell tickets or other passes to a customer for an event, service, travel, etc., ticket information 424 stores any information pertaining to that ticket. For example, for purchase of an airline ticket, information such as flight number, seat assignment, confirmation number, frequent flyer number, etc., may all be stored within file 300. It is also possible for a cash value 426 to be stored within file 300 for use by a customer when purchasing goods or services. Cash value 426 is incremented when a customer loads cash value onto the card, and is decremented when the customer uses cash value 426 to purchase goods or services from a merchant. Medical and other personal information 428 and 430 may also be stored on the card.

Preferably, an organization wishing to help establish loyalty programs using features of the present invention will define a particular file structure beforehand. A specification of the defined file structure should then be made available to issuing banks, acquiring banks and to merchants implementing a loyalty program. In one embodiment, the organization defining the file structure is a payment association such as Visa International.

Card Issuance and Use

Figure 5:
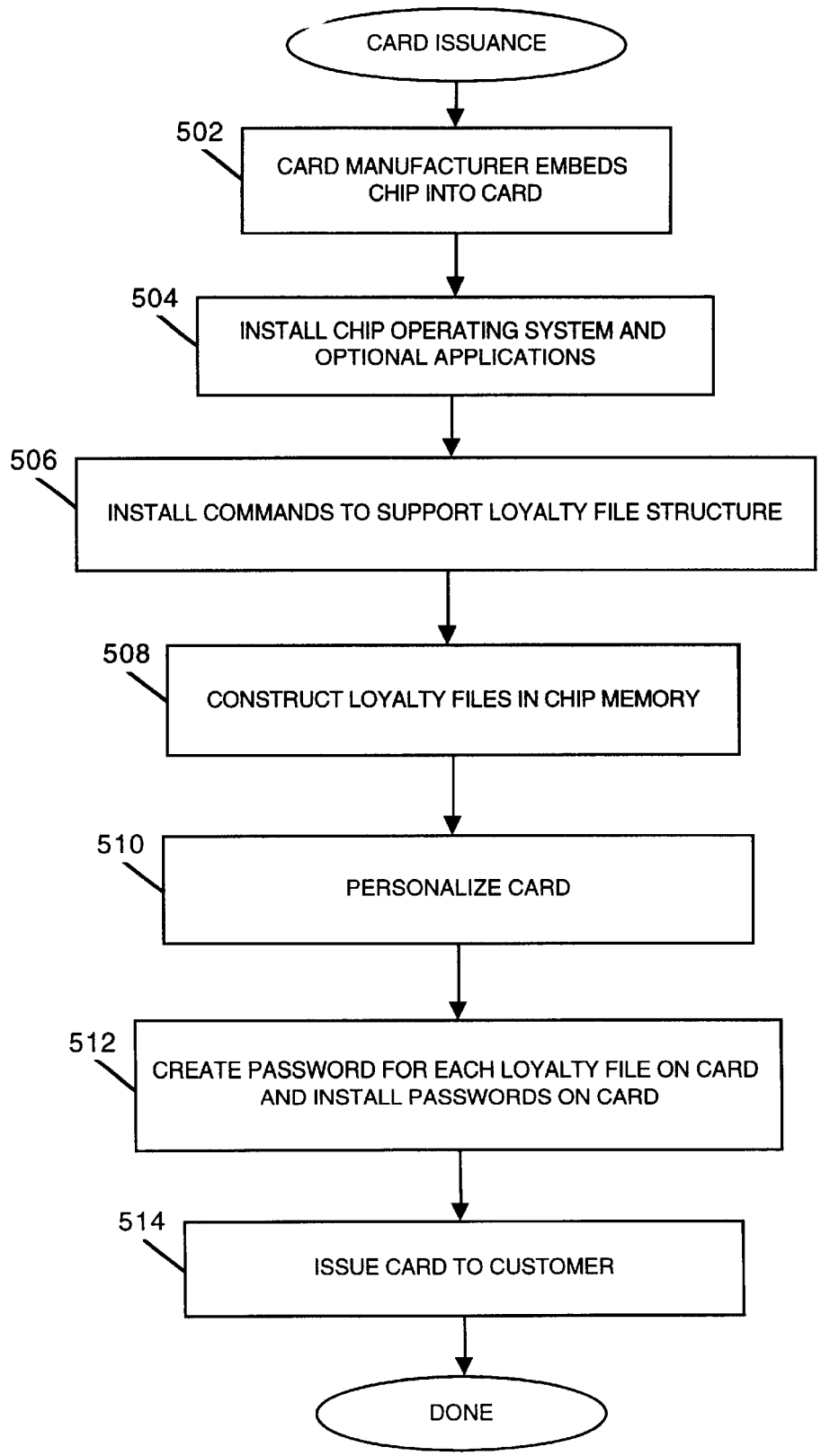
FIG. 5 is a flow chart illustrating one embodiment of the invention in which a smart card is manufactured, loaded with software, personalized and issued to a customer.

FIG. 5 is a flow chart illustrating one embodiment of the invention in which a smart card is manufactured, loaded with software, personalized and issued to a customer. The steps described below need not necessarily be performed in the order described and could be performed entirely or in part by a manufacturer, a card issuer, or another party.

In step 502 a card manufacturer embeds a chip into a smart card. Those of skill in the art will appreciate that this step can be performed by any suitable card manufacturer using any of a variety of integrated circuits and in many different ways. By way of example, the chip embedded into the smart card is any suitable integrated circuit and is preferably a processor chip that contains a microprocessor. Examples of chips that may be used are those manufactured by Hitachi, Siemens, Motorola, Thompson, etc. Furthermore, any of a variety of card manufacturers may be used such as Gemplus, Schlumberger, Bull, G&D, etc.

In step 504 the chip operating system and any optional applications desired are installed onto the chip on the card. Preferably, an encryption algorithm is also installed onto the chip for use in decrypting information that the card receives and for encrypting information that the card may transmit. Although a wide variety of encryption standards and techniques may be used (such as those described in Applied Cryptography referenced above), preferably the encryption algorithm defined by the Data Encryption Standard (DES) is used.

Step 506 installs a variety of commands that are part of the chip operating system to support one embodiment of the loyalty file structure of the present invention. Although step 506 appears as a distinct step for clarity of explanation, preferably these commands are installed along with the chip operating system and form a subset of functionality within that operating system. These commands are implemented by the operating system to perform various reading and writing functions with respect to loyalty files stored on the card. Available as operating system level commands, they may be called by loyalty operator application software located in a terminal or other card reader device, by software running on a personal computer, by software implemented by an issuer or other entity managing the loyalty file structure, or by any of a wide variety of other software running on computers or other smart card interface devices. For example, software running within a merchant terminal would use these commands in the course of interacting with a customer's card in the terminal for purposes of implementing a loyalty program.

These loyalty file structure commands may be implemented in any suitable language used by the chip on the smart card and can perform a wide variety of functions. It will be appreciated that these commands illustrate in general the functionality used to implement the present invention, and that their specific names are arbitrary and may change. Furthermore, other commands implementing similar functionality may also be used to implement the present invention. In one embodiment of the invention, these commands include the following functions: Search Files, Install Password, Change Password, Change Label, Change Rented?, Read Data, and Write Data.

The Search Files command is used to find loyalty files on a smart card that have not yet been rented by another merchant's loyalty program. This command does not necessarily need any input parameters and returns as an output a list of one or more loyalty files found on the card that are available for use by a merchant. In a preferred embodiment of the invention, this command reads the Boolean flag Rented? 308 of each file to determine if a loyalty file is already in use or not.

The Install Password command allows an issuer to install the initial password for each loyalty file on a card. Typically, this is a personalization command used only by the issuer when the card is in a personalization machine before issuance to a customer. This command accepts as input parameters an initial password for the loyalty file and the loyalty file number on the card. The output of this command indicates whether or not installation of the password was successful. As is common with personalization commands, once Install Password has been used by the issuer to set the initial password for a file, it can no longer be used by another entity. This safeguard prevents an unauthorized party from gaining access to a loyalty file by resetting the password. Should a merchant or any future terminal attempt to use this command, the smart card will reject the command.

The Change Password command is used with authorization by the issuer in real time to change the password for a particular loyalty file on a smart card while the card is present in a merchant terminal. This command allows the initial password installed by the issuer to be replaced by a password known to the loyalty operator so that the loyalty operator may begin to use the loyalty file on the card. This command takes as input parameters a new password and a loyalty file number. The command outputs an indication of whether or not the changing of the password was successful. Preferably, this command is given using a secure messaging technique to ensure that it may only be used with authorization from the issuer. In one embodiment, an encryption key shared only between the issuer and the card (to be added during personalization) is used to ensure that this command is authorized by the issuer.

The Change Label command allows label 306 on a loyalty file to be changed to reflect an identification of the merchant that is now using the loyalty file. This command accepts as input a new label and a loyalty file number. An output indicates whether or not the command was successful. The command may also be used to erase a merchant identifier or to return the label to an initial state. The Change Rented? command allows Rented? flag 308 to be changed to indicate that either a file is now in use, or is available for use. The command accepts as input a loyalty file number and outputs an indication of success.

In one embodiment, once the loyalty operator has been authorized to replace the password for a particular loyalty file with one of its own using secure messaging, the operator may then give the Change Label and Change Rented? commands. In an alternative embodiment, each of the Change Password, Change Label and Change Rented? commands may only be executed by a merchant terminal with the proper authorization from an issuer using secure messaging. These various levels of security allow an issuer to maintain control over which loyalty files on a card are being rented to whom, and allows an issuer to ensure that fees for renting a loyalty file are being properly paid. An issuer may also take other steps for control as needed.

The Read Data command is used to read any information contained in data portion 314 of a loyalty file for use by a merchant in implementation of their loyalty program. The read data command accepts as input a file number and either a displacement and length, or a record number depending upon whether the format of the file is transparent or fixed. This command returns as output the data found at that location. The Write Data command is used to change data within data portion 314. As with the Read Data command, the Write Data command accepts as input a location within data portion 314 to be changed, and also accepts a new data value to be written to that location. An output indicates whether or not the update was successful. In a preferred embodiment of the invention, the Read Data and Write Data commands may only be executed by an authorized entity. For example, only an issuer or a merchant knowing the password associated with a particular loyalty file may read data or write data contained within data portion 314 of that loyalty file. Such an arrangement allows information contained within a file to be kept private, and ensures that only those merchants who have paid a fee (or who have made some other arrangement or have obtained permission) to the issuer may make use of a loyalty file on a card.

Step 508 constructs or otherwise reserves space for any number of loyalty files in a memory of the chip on the card. In a preferred embodiment of the invention, a loyalty file is organized as shown in FIG. 3, although a wide variety of other formats may also be used. Preferably, loyalty files are implemented in memory that may be both written to and read from, and is static in nature. More preferably, the loyalty files are implemented in an EEPROM on the chip. At this point, the smart card is ready for delivery to the issuer for personalization and later issuance to a customer. Of course, it is conceivable that the chip manufacturer or other entity may also perform the following steps.

In step 510 the card is personalized. A personalization step for a card will be familiar to those of skill in the art and may be performed in a variety of manners. By way of example, card personalization includes embossing the card with the customer name, an account number and expiration date. This and other information may also be added to a magnetic stripe on the card if present, and to memory within the chip on the card. Other personalization steps include setting necessary parameters for any pre-determined applications, such as credit, debit, or stored value.

Preferably, the issuer also adds an encryption key to a secure location within the chip that will be shared between the chip on the card and the issuer. This encryption key can then be used for later secure messaging between the smart card and the issuer. For example, use of the encryption key by the smart card allows the card to receive encrypted information from the issuer, and to decrypt it with the assurance that the information and/or commands contained within have been authorized by the issuer. By the same token, encrypted information received by the issuer from the smart card can be decrypted by the issuer using the shared encryption key with the assurance that the decrypted information has been transmitted by a valid smart card that had previously been issued by the issuer. Any number of types of encryption keys may be used. In a preferred embodiment of the invention, an encryption key using the Data Encryption Standard (DES) is used.

In step 512, the issuer creates a password for each loyalty file on the card and installs these passwords on the card in association with their respective loyalty files. The issuer may create passwords for each loyalty file using a variety of techniques. In a preferred embodiment of the invention, a DES key is used with the customer's primary account number (PAN) in order to derive a suitable password for a loyalty file. In a more preferred embodiment, a password for a particular loyalty file is derived from both the PAN and the loyalty file number to produce a unique password for that loyalty file on the card. In this fashion, an issuer will later be able to derive a particular password for a loyalty file knowing only the customer's PAN and the loyalty file number and will not need to store or otherwise archive passwords for loyalty files. Once these passwords have been created, each password is installed on the smart card in association with the loyalty file to which it corresponds. In a preferred embodiment of the invention, the Install Password command discussed above is used to perform this function. Preferably, no read from or write to a file is allowed unless its password is presented. Once this step has been completed, the card is ready to be issued to a particular customer for use in commerce.

Advantageously, the above steps that make loyalty file commands available in a chip operating system and help implement a loyalty file structure on a chip may be performed by any entity in the smart card manufacturing and issuance process. Benefits to the customer include having a smart card that is now ready to take part in any loyalty program of a merchant that wishes to make use of the loyalty files present on the card. One benefit to the merchant is that all customers holding such a smart card with a loyalty file structure will be able to take part in that merchant's loyalty program regardless of the issuing bank and without the need for the merchant to negotiate a prior agreement with an issuer.

Preferably, the format used for the loyalty file structure and the commands installed are communicated to issuing banks, acquiring banks, and merchants who wish to make use of the loyalty file structure to implement their loyalty program. In one embodiment, this specification is handled by Visa International.

A merchant may then write loyalty application software using any software and of any design that the merchant desires. Preferably, this loyalty application will be resident within read-only memory within a merchant terminal. As will be appreciated by those of skill in the art, any suitable application running within a merchant terminal or on a card reader may be used to interact with a smart card and to communicate on-line and/or in real time with a card issuer. By way of example, current communication protocols for use between a credit card terminal and an issuing bank may be used in a similar fashion in an embodiment of the present invention to allow a loyalty application to communicate with an issuer. As described below, the loyalty application software makes use of a variety of the commands that have been installed in the chip operating system to implement the merchant's loyalty program.

Figure 6:
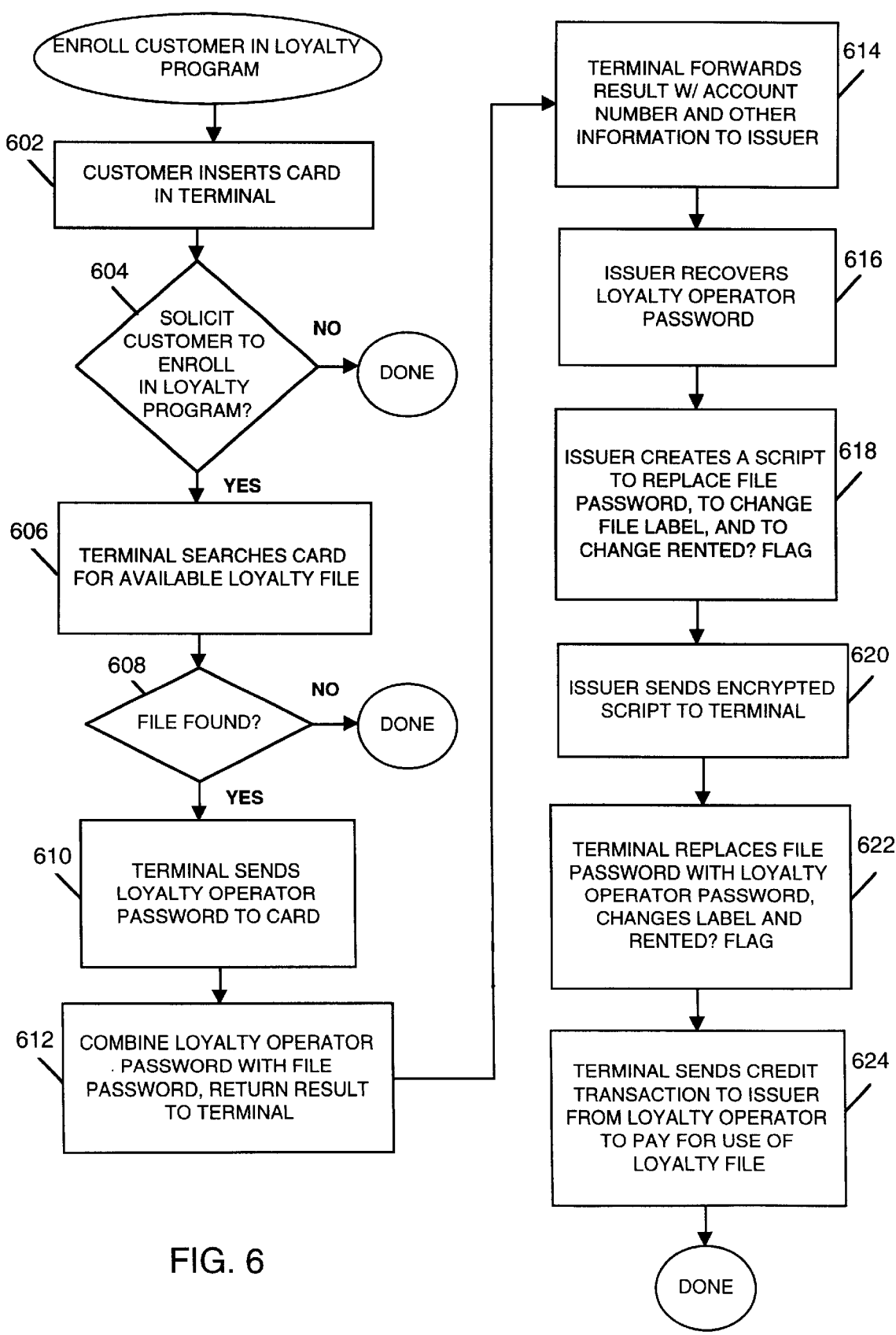
FIG. 6 is a flow chart illustrating one technique by which a customer is enrolled in a loyalty program.

FIG. 6 is a flow chart illustrating one technique by which a customer is enrolled in a loyalty program. In this scenario, the customer is in possession of a smart card having a loyalty file structure as described above but is not yet enrolled in a loyalty program for a particular merchant. In step 602 the card is inserted into the terminal. Alternatively, if a contactless smart card is used, the card may be presented to, or otherwise passed by, a terminal. The card may be inserted into or presented to the terminal for any of a variety of reasons. For a typical payment transaction, the customer inserts the card into the terminal so that funds or points may be deducted from the card or so that a credit payment transaction may take place. Alternatively, the customer is making the payment via cash, debit card, check, etc., and the card is being inserted into the terminal for the purposes of enrollment in the loyalty program.

In step 604 it is determined whether to solicit the customer to enroll in the loyalty program. This step may be performed in a variety of ways and may even be optional. For example, the clerk or loyalty application software within memory 254 of terminal 202 may automatically ask the customer whether he or she desires to take part in the merchant's loyalty program. This solicitation may occur even before it is determined whether any available loyalty files exist, whether the customer is already enrolled, or before any other information is determined. Preferably though, the clerk and/or the loyalty application performs a few checks to determine whether it is suitable to solicit the customer's enrollment. For example, the bank identification number on the card can be checked to make sure that the customer is local and will be frequenting the merchant's business often. It may not be desirable for a merchant to solicit the enrollment of a European customer who is only present and buying goods within California for a short period of time. Also, if a customer's card is due to expire soon, the merchant may not wish to spend the time and money in renting a loyalty file on the card. Other parameters and information may also be checked before this solicitation occurs. If it is determined not to solicit the customer, the customer is not enrolled and the transaction may be completed.

If it is determined that the customer should be solicited, in step 606 the terminal searches the card for an available loyalty file 300 for the merchant's loyalty program to use. Of course, this step could also take place before solicitation in step 604 to make sure that a loyalty file 300 is available. In one embodiment of the invention, the loyalty application uses the Search Files command to look for a loyalty file 300 whose Rented? flag 308 is false. If no available file is found (indicating that all of the loyalty files on card 104 are currently in use by other merchants) then card 104 is returned to the customer. If one or more available loyalty files are found on the card, then enrollment of the customer may begin. The merchant may decide to use only one loyalty file 300 for use with his loyalty program or decide to rent more than one file if available. The merchant may decide to protect more than one file with the same password or with different passwords.

It is conceivable at this point that once an available file has been found that the merchant's loyalty application software may be allowed to replace label 306 with a merchant identifier, set Rented? flag 308 to true, change password 302 to a password known only to the merchant, and to begin writing data to and reading data from data portion 314 of the card. In a preferred embodiment, however, the merchant is not allowed to begin using a loyalty file immediately, but must receive authorization through an issuer so that the issuer is aware of who is renting which particular loyalty file on the customer's card and may receive the revenue for that rental due the issuer.

The following steps illustrate one technique by which a merchant indicates to an issuer a particular loyalty file that the merchant wishes to rent, and by which the issuer returns authorization and the ability for the merchant to begin using the loyalty. Of course, other similar steps and techniques may also be used to perform the same general function. Advantageously, the following steps require no prearranged agreement between the merchant and the issuer and no prearranged key management. Also, the following steps are preferably performed in real-time while a customer is waiting with his or her card in the terminal. The ability for a merchant to enroll a customer in a loyalty program in real-time and also provide payment to an issuer for such a service at the same time is one advantage of the present invention.

In step 610 terminal 202 sends the loyalty operator password to card 104. The loyalty operator password is any suitable password that the merchant uses for identification and for exclusive access to a loyalty file 300. The password may be a fixed password used by the merchant, or it may be generated or derived in real time as the enrollment is being processed. In step 612 the loyalty operator password is combined with the file password for the available loyalty file to produce a combined result. This result is then returned to the terminal. Combination of the two passwords and the communication of the result back to the issuer and the eventual receipt of a new password for the loyalty file may be performed in a variety of manners. By way of example, such steps may be performed as described below with reference FIGS. 8A, 8B and 8C. The particular technique or algorithm used to combine the loyalty operator password with the loyalty file password is preferably known to the issuer. Thus, because the issuer knows this technique and is also able to derive (or has stored) the particular loyalty file password, the issuer will be able to recover the loyalty operator password. In an alternative embodiment, the loyalty operator password is either encrypted by the customer's PIN entered into the terminal or the derived DES key shared between the card and the issuer. In another alternative embodiment, the merchant need not send the loyalty operator password to the issuer, but still receives authorization from the issuer and the ability to replace the file password with the loyalty operator password. The issuer may even transmit the file password to the merchant for use (i.e., leave it unchanged).

In step 614 the terminal forwards the combined result along with the customer primary account number, the loyalty file number to be rented and any other relevant information back to the issuer in real-time over communications network 204. This communication from the terminal to the issuer may also occur in conjunction with a payment authorization, for example, should the cardholder be making a credit payment using an application of the card. The terminal may also be communicating with the issuer or other entity for the purposes of incrementing or decrementing funds on the card or for other purposes related to the transaction. In this fashion, the communication back to the issuer of the combined result can piggyback onto a transaction that would be occurring anyway.

In step 616 the issuer recovers the loyalty operator password from the combined result. Upon receiving from the terminal the combined result, the customer primary account number and the loyalty file number to be rented, and by virtue of knowing the technique by which the two passwords were combined on the card, the issuer can recover the loyalty file password. In this fashion, the loyalty operator password has been transmitted in a secure manner back to the issuer. Of course, other secure techniques may be used. For example, the loyalty operator password and/or the loyalty file password may each be encrypted using the encryption key that is shared between the card and the issuer. In an alternative embodiment, the issuer may send an encrypted password to the merchant terminal that the terminal is able to decrypt and use as the new merchant password instead of the merchant sending its password to the issuer.

In step 618, the issuer creates a secure script using secure messaging to replace the loyalty file password on the customer card with the loyalty operator password, to change the file label of the loyalty file to a merchant identifier, and to set the Rented? flag to true. In this fashion, the issuer retains control over which password is associated with a loyalty file, which is the file label, and whether or not a file is rented. In a preferred embodiment of the invention, the information and commands within the script are encrypted using the shared encryption key between the card and the issuer. Preferably, the issuer also returns the original password to prove to the card that the script is genuine. In another embodiment, secure messaging is used to allow the terminal to change the password of the loyalty file; once changed, the terminal may then change the file label and the Rented? flag on its own.

In step 620 the issuer sends this encrypted information back to the loyalty application software within the terminal. In step 622 the terminal uses the script to replace the password of the available loyalty file with the loyalty operator password received from the issuer, to change label 306 of the file to the merchant identifier received from the issuer, and to set the Rented? flag 308 to true. Preferably, the Change Password, Change Label, and Change Rented? commands are used. The loyalty application software within terminal 202 is prevented from changing this information on its own without authorization of the issuer because of the secure messaging technique used between the issuer and the card.

In a preferred embodiment of the invention, each of these three parameters associated with the loyalty file must be changed successfully before the loyalty file can be rented by the merchant. If any one of the password, label and/or Rented? flag are not changed successfully, then preferably the enrollment terminates and the merchant is not allowed to rent a loyalty file.

Now that the password of the loyalty file has been changed to that of the loyalty operator/merchant, the merchant will now have access for reading and writing of that loyalty file. In one embodiment the merchant has exclusive access; in other embodiments more than one merchant may share a loyalty file, or another entity such as an issuer may also have access. Label 306 of the file indicates via the merchant identifier that the merchant is using this file and also Rented? flag 308 indicates to other loyalty applications that this file is currently in use.

In step 624 the merchant, using any suitable method, makes a payment to the issuer for use of the loyalty file. This payment may take place in any suitable manner such as by credit card, check, debit from an account, wire transfer, etc. In a preferred embodiment of the invention, the terminal sends a credit transaction to the issuer from the merchant to pay for the use of the loyalty file. This credit transaction is similar to a credit sent at the end of the day from a merchant through an acquirer to an issuer for goods that have been returned by a customer. Unlike a payment transaction in which funds from the issuer are transferred to the acquiring bank of the merchant, a credit transaction results in a payment being made from the merchant's acquiring bank to the issuer. In this fashion, payment from the merchant to the issuer is made quickly and efficiently. Preferably, this credit transaction occurs during the same on-line transaction when the issuer is authorizing use of a loyalty file by the merchant. Thus, a new on-line transaction is avoided and the issuer receives payment immediately upon allowing access to the loyalty file by the merchant. The step of sending a credit transaction to the issuer may be performed at any time during the on-line transaction, may be performed at some later time in batch mode, beforehand, or may be performed using a different manner of payment. For example, the issuer may decide not to release the script or file password (which allows access to the loyalty file by the merchant) until the merchant has in some way indicated a guaranteed payment to the issuer for use of a loyalty file. Alternatively, the merchant may batch a number of card rentals and submit them on a regular basis to aggregate payment.

Figure 7:
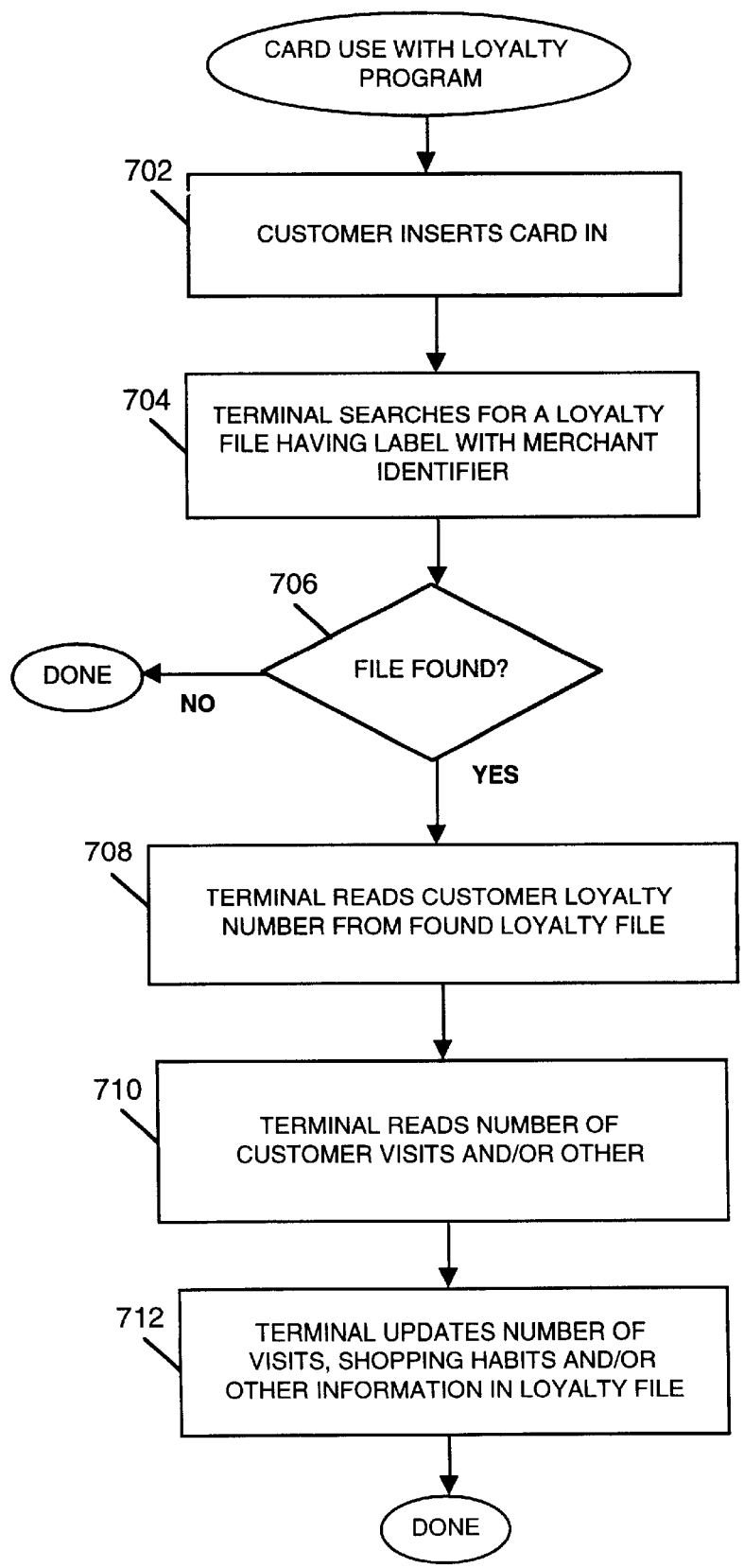
FIG. 7 is a flow chart illustrating an example of how a customer enrolled in a merchant's loyalty program may make use of that program.

FIG. 7 is a flow chart illustrating an example of how a customer having a card which is enrolled in a merchant's loyalty program may make use of that program. Although FIG. 7 is presented as a separate flow chart, it is likely that a customer may make use of a loyalty program immediately upon enrolling in that program (i.e., during that same first transaction). Of course, once a customer has enrolled in a merchant's loyalty program, any subsequent interaction may occur as shown in FIG. 7. In step 702 a customer presents his or her smart card to a terminal for either the purchase of goods or services, to take part in the loyalty program, or for other similar reasons as described in step 602.

In step 704 the terminal searches the card for a loyalty file having a label 306 that corresponds to the merchant in question. In step 706 if such a file is not found, then the loyalty interaction terminates. Alternatively, if a loyalty file with the merchant identifier is not found, this indicates that the customer is not currently enrolled in the loyalty program of the merchant. Accordingly, steps 604 and/or 606 may be performed to determine whether to solicit the enrollment of the customer. For example, steps 706 and 606 may be performed together before making the determination shown in step 604. Many other variations regarding solicitation of a customer and whether or not to enroll a customer are also possible.

It will be appreciated at this step in the process that once a loyalty file has been identified on the card that is being rented by a particular merchant, the loyalty application software within the merchant terminal is completely free to perform whatever reading, writing, updating, or other processing of the data within that loyalty file for the purposes of implementing the merchant's loyalty program or for other purposes related to a transaction with a customer. By way of example, if a loyalty file corresponding to the merchant is found, then in step 708 the terminal reads the customer loyalty number from the loyalty file to identify that customer who is enrolled in the merchant's loyalty program.

As described above, in one embodiment of the invention, the loyalty application software is not able to directly change password 302, label 306 or Rented? flag 308 as these are under control of the issuer. Similarly, in a preferred embodiment, loyalty operator password 302 is required when the loyalty application wishes to either read or write data in data portion 314 of the loyalty file. This requirement ensures that only the appropriate merchant who is renting a particular loyalty file can either read from that file or can write to that file. Such a security measure protects the privacy interests of both the customer and the merchant, and ensures that the issuer receives revenue for loyalty files that are rented. The merchant may also decide the level of security needed for each situation, depending upon the card, business, customer, etc. Data written to a loyalty file by a merchant may be encrypted or not, at the merchant's desire. Further password protection, challenge-response, etc., may be implemented by the merchant if desired for access to the rented loyalty file. Advantageously, the level of security may be determined or changed by the merchant at any time after enrollment of the customer, and need not be determined before the card is issued.

In this specific example, in step 710 the terminal uses the Read Data command to read the current number of customer visits and other information from data portion 314. Processing of this information may then occur within the loyalty application, and in step 712 the terminal updates the number of visits, shopping habits and other relevant information in the loyalty file. An example of the types of information that may be read or updated has been described above with reference to FIG. 4. Of course, other information, transactions and/or financial arrangements may also be recorded in the loyalty file. A wide variety of other updates may also occur in place of steps 708–712.

FIGS. 8A–8C illustrate one specific technique by which a merchant determines an available file and receives the ability to write to and read from that file. In this specific example, FIGS. 8A–8C illustrate one technique by which steps 606–622 may be implemented. Of course, other techniques by which an issuer provides access to a file by a merchant are also possible. FIGS. 8A–8C illustrate a portion of loyalty file 300 showing Rented? flag 308, loyalty file number 304, and password 302. FIG. 8A illustrates a query from terminal 202 to file 300 as to whether that particular file is available for use by the merchant. Because flag 308 has a value of false, the card returns yes 812 to terminal 202.

FIG. 8B illustrates the transfer of loyalty operator password 814 from terminal 202 to card 104. Card 104 then combines loyalty operator password 814 with loyalty file password 302 to produce combined result 816. In this example, the two passwords are combined using an XOR logic function to produce the combined result. This combined result 816 is then passed from terminal 202 to issuer 102. The issuer is then able to recover loyalty operator password 814 by using the same XOR function on combined result 816 with loyalty file password 302. Loyalty file password 302 is known to the issuer either because the issuer has stored the value in conjunction with the card's primary account number, or because the issuer derives loyalty file password 302 from the primary account number and the loyalty file number 304.

FIG. 8C illustrates that once the loyalty operator password 814 has been recovered by the issuer, the encrypted password 820 is passed back to card 104 and to loyalty file 300 via terminal 202. Preferably, the password is encrypted using the encryption key shared between issuer 102 and card 104. Password 820 can then be decrypted by the card and stored as the new file password 302 for loyalty file 300.

Ticket Purchase Confirmation Embodiment

Figure 9:
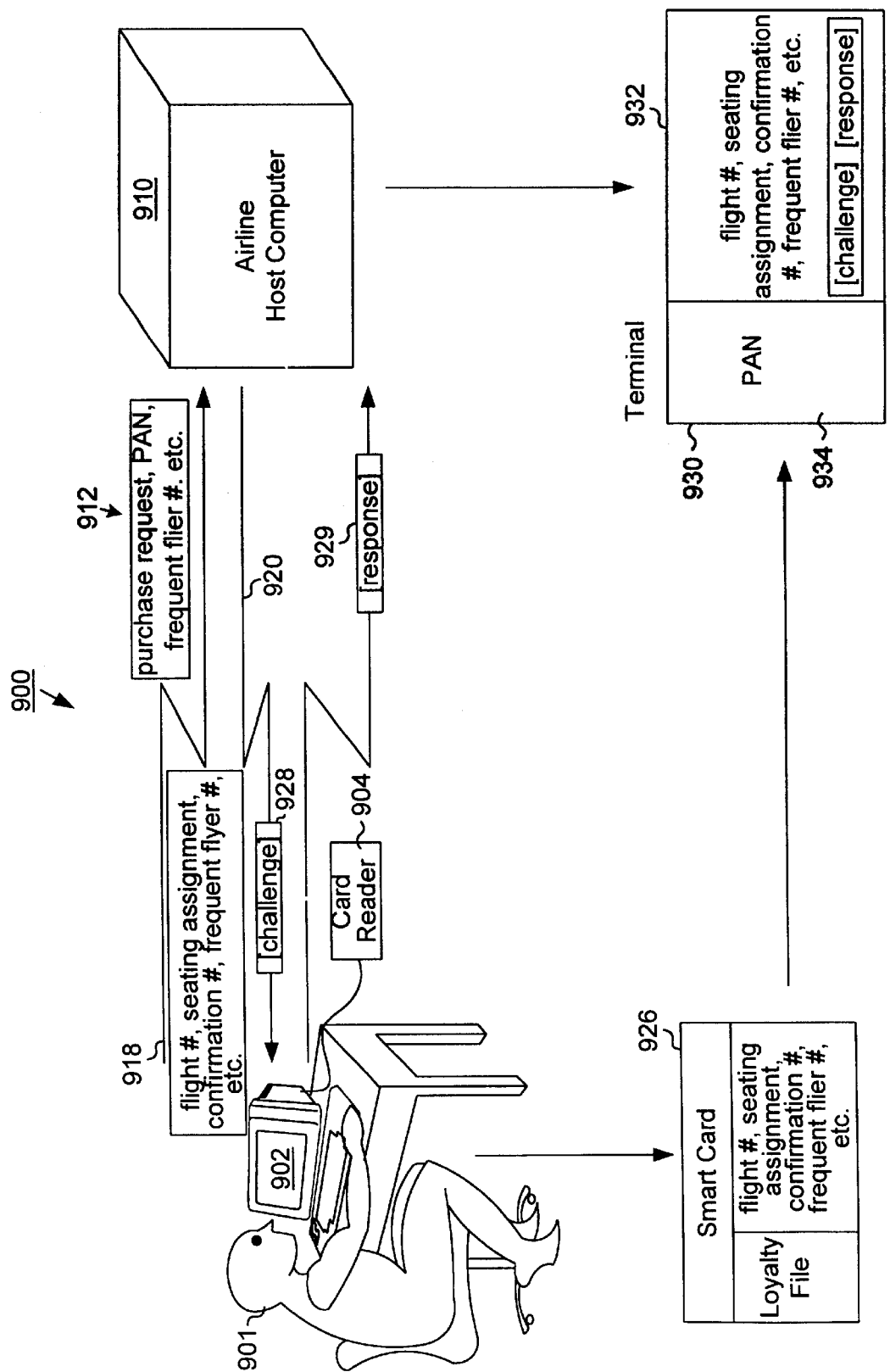
FIG. 9 illustrates an alternative embodiment in which a customer purchases goods and/or services from a merchant at a customer point-of-convenience and then later receives those goods and/or services by showing appropriate authorization.

FIG. 9 illustrates an alternative embodiment 900 in which a customer purchases goods and/or services from a merchant at a customer point-of-convenience and then later receives those goods or services by showing appropriate authorization. In this example, a customer 901 is purchasing an airline ticket on-line. Customer 901 interacts with a computer 902 having an associated card reader 904 to communicate with an airline host computer 910 over a telecommunications network 912 such as the Internet. Although customer 901 is shown in this example interacting with a personal computer in either home or office, this interaction can also take place at a kiosk, in a merchant's store, at a self-service terminal, or other environment in which a customer and his or her smart card communicate with a merchant.

Using known techniques for purchase requests over a telecommunications network, customer 901 submits a purchase request 918 to host computer 910 including information such as a purchase request, a primary account number of the customer's smart card, the customer frequent flyer number, etc. At this point, host computer 910 may require payment from customer 901 using any of a variety of known techniques such as use of a debit card, a credit card transaction, debit from stored value of a smart card, etc. Indeed, the smart card that customer 901 has inserted in card reader 904 may perform any or all of these functions and may also include a loyalty file structure as described above. Assuming the purchase request is accepted, host computer 910 determines an appropriate loyalty file for use on card 104 (for example, as explained in FIGS. 6 and 7) and sends a response 920 to the customer's card. Response 920 contains any of a wide variety of information for later use by the airline in confirming that customer 901 has in fact paid for the specified airline ticket. For example, response 920 includes the flight number, a seat assignment, a confirmation number, a frequent flyer number, etc. This information is stored in loyalty file 926 that the airline is currently renting from the issuer and will be used later to confirm that the customer has in fact paid for the ticket. The enrollment of the customer may take place during this transaction, or may have taken place earlier.

As an optional level of security, host computer 910 may also send a challenge 928 to card 104. Card 104 responds to the challenge by encrypting the challenge using the shared encryption key (shared between the card and the issuer) and returning the encrypted challenge as response 929. Once response 929 is received at host computer 910, the airline may send this challenge-response pair back to the issuer for confirmation that a valid smart card issued by the issuer has in fact responded to host computer 910. Further comparison of the PAN, and or other customer information with the challenge-response pair and/or the shared encryption key can further confirm that host computer 910 has engaged in a transaction with a valid card and/or a valid customer.

Once the transaction has been completed between customer 901 and host computer 910, the host computer transmits to a terminal 930 located at the airline boarding gate the same information it had previously transmitted to the loyalty file of the customer's card. This information 932 stored within terminal 930 in conjunction with the customer primary account number (PAN) 934 is used to confirm when the customer arrives at the boarding gate that he or she is in fact entitled to receive a boarding pass.

When the customer arrives at the boarding gate, the customer smart card is inserted into terminal 930. The terminal searches for the loyalty file on the card corresponding to the airline, and reads information within that file regarding the airline ticket that the customer has purchased. The PAN from the card is also read as well. Next, the PAN from the card and the information from the loyalty file are compared with the corresponding information stored within the terminal for that particular PAN. Assuming that there is a match, this indicates that the cardholder presenting card 926 at the boarding gate has in fact already paid for the ticket indicated and a boarding pass may be given to the customer.

For an added level of security, the previously calculated challenge-response pair that is in possession of host computer 910 is also stored within terminal 930. Advantageously, terminal 930 need not include complicated and time-consuming encryption algorithm software. Terminal 930 simply sends challenge 928 to card 926. As before, card 926 uses its shared encryption key to encrypt challenge 928 to produce response 929. This response is then transmitted to the terminal. Terminal 930 then merely needs to compare the response from card 926 to the response it has stored in its own memory. If there is a match, this indicates that the card currently in the terminal was in fact the card that had previously been used to purchase a ticket and the same in which ticket information had been previously stored. In an alternative embodiment, a secure application module may be added to the terminal to allow encryption and decryption within the terminal itself.

Alternative Embodiments

It should be appreciated that this embodiment illustrated in FIG. 9 applies not only to the purchase of airline tickets, but also to the purchase of a great variety of goods and services from a merchant. In general, FIG. 9 illustrates a situation in which a customer using his or her smart card and a card reader is able to purchase goods and/or services from a merchant and to receive confirmatory information to be stored within a loyalty file of the customer's smart card. At a later date, or in a different location, the customer then merely presents the smart card having the confirmatory information stored within the loyalty file and this information is compared to information received from a merchant computer to determine in fact that the customer presenting the card is due the appropriate goods and/or services. The goods and/or services may then be released to the customer. Furthermore, this embodiment need not be limited to purchases, but may also be used whenever important or sensitive information needs to be transmitted to a customer, stored within a loyalty file within that customer's smart card, and then be read and confirmed at later date or in a different place using a card reader device. The loyalty file may also be used as a travel voucher, customer profile, etc.

In one embodiment a purchase by a customer at a merchant triggers the terminal to place a "coupon", "time stamp" or "confirmation of purchase" into a rented loyalty file. The customer may then present the smart card at a later point in time to a terminal which then reads the previously placed information and provides a benefit to the customer. For example, payment for rapid transit using a smart card with a rented loyalty file would cause the rapid transit terminal to place a coupon into the loyalty file. The customer then presents the smart card having the coupon stored therein at another terminal to receive free bicycle storage while riding transit, a free bus transfer, free admission to an entertainment show, etc. The second terminal that reads the electronic coupon directs a terminal operator or computer to provide the benefit to the customer. The electric coupon may then be erased from the loyalty file, its value decremented, etc. A single merchant may control each of the terminals that place coupons and provide benefits, or any number of merchants may agree to share a particular loyalty file and its password for implementation of this embodiment. The loyalty file may also be used to store a day pass or a monthly pass good for passage on the rapid transit. Each time the smart card is presented, the terminal reads the loyalty file, acknowledges the presence of the pass, and permits the customer to enter. A time stamp (or other code) in association with the pass lets the terminal know for how long the pass is valid. Once the pass is used up, it may be deleted from the loyalty file by the terminal.

In another embodiment, a rented loyalty file serves as an electronic version of a customer's identification card for a business or other entity. For example, a library may rent a loyalty file on a smart card to store the customer's library card number, the books borrowed, their due dates, any fines outstanding, and other pertinent library information. When the customer returns to return books, the library's rented loyalty file is read by a terminal to assist with book return. Upon check out, the loyalty file may be read to ensure that previous books have been returned and that no fines are due. Using this embodiment, any type of business or individual may use a rented loyalty file for customer identification.

In another embodiment, a group of merchants may agree to share a particular loyalty file for an incentive program. Upon presentation of the smart card by a customer to the first merchant, a particular loyalty file is rented for this purpose. When the customer makes a purchase, a "total sales" counter is incremented in the rented file. This counter is incremented for each purchase the customer makes from one of the participating merchants. By prior arrangement, the merchants have agreed upon a loyalty file name, password, and protocol for incrementing the counter. At the end of program, the customer is rewarded with a special gift if the counter has reached a certain amount.

In another embodiment, a loyalty file on a smart card is used for access control. For example, smart cards issued to employees of a company may store employee information in a loyalty file that permits access to certain areas of the company. The loyalty file structure used need not be implemented on specially issued smart cards, but may be part of an employee's everyday credit or debit card, or corporate-issued card that includes an integrated circuit suitable for implementing the present invention.

Although the foregoing invention has been described in some detail for purposes of clarity of understanding, it will be apparent that certain changes and modifications may be practiced within the scope of the appended claims. For instance, a loyalty file may be implemented on a magnetic stripe card as well as on an integrated circuit card. Also, any entity other than an issuer may exercise control over use of loyalty files, and may provide access to the files by a merchant using many techniques. In addition, enrollment and/or data update of a loyalty file need not take place at a merchant site, but could occur over the Internet or other network, at an ATM, at a kiosk, ticket counter, etc. A loyalty file and its contents may take many forms, the file described herein is merely one example. Also, card issuance can be performed by many different parties, by a single party, by a merchant or partially over the Internet. Other applications include: vehicle identification, licenses, passes, electronic payment, luggage identification, etc. It should be apparent that the present invention has an almost limitless range of applications and that it would be difficult to describe all of them in a single document; however, the reader will appreciate the broad scope of the invention. Therefore, the described embodiments should be taken as illustrative and not restrictive, and the invention should not be limited to the details given herein but should be defined by the following claims and their full scope of equivalents.

I claim:

1. A system that facilitates implementation of a loyalty program by a merchant, said system comprising:

a smart card including a data file and an associated file password necessary to access said data file, said data file not accessible by said merchant without authorization from an issuer, said smart card being issued to a customer by said issuer;

a card reader device that reads from and writes to said smart card and is associated with said merchant;

a communications network connecting to said card reader device; and an issuer computer under control of said issuer connected to said communications network, said issuer computer being arranged to accept a request from said merchant for access to said data file, and being further arranged to transmit an authorization to said card reader device to allow said merchant to access said data file of said smart card with the permission of said customer, said authorization operating to allow the replacement of said file password with a merchant password known to said merchant, whereby said merchant may use said data file for implementation of said loyalty program for the benefit of said customer.

2. A system as recited in claim 1 wherein said request from said merchant is sent in real time to said issuer computer and wherein said issuer computer transmits said authorization in real time back to said card reader device while said customer associated with said smart card is waiting.

3. A system as recited in claim 1 wherein said merchant transmits to said issuer a credit transaction using an existing settlement system in exchange for said authorization from said issuer.

4. A system as recited in claim 1 wherein said card reader device is a merchant terminal that includes loyalty application software for implementing said loyalty program, said merchant terminal being arranged to transmit said request to said issuer and to receive said authorization from said issuer in real time.

5. A system as recited in claim 1 wherein said data file of said smart card includes:

a file password, knowledge of which is necessary to access said data file; and a rental indicator indicating whether or not said data file is being used by a merchant.

6. A method of enrolling a customer of a merchant in a loyalty program, said method comprising:

accepting at a card reader device associated with said merchant a smart card of said customer that has been issued by an issuer, said smart card including a data file and an associated file password necessary to access said data file, said data file not being accessible by said card reader device;

transmitting to an issuer of said smart card via a communications network a first message indicating the desire by said merchant to gain access to said data file of said smart card; and receiving from said issuer a second message including data that allows said card reader device to gain access to said data file of said smart card with the permission of said customer, said data of said second message operating to allow the replacement of said file password with a merchant password known to said merchant, whereby said merchant may use said data file for implementation of said loyalty program for the benefit of said customer.

7. A method as recited in claim 6 wherein said elements of transmitting and receiving occur in real time while said customer is waiting.

8. A method as recited in claim 6 further comprising:

transmitting from said merchant to said issuer a credit transaction using an existing settlement system in exchange for access to said data file.

9. A method as recited in claim 6 wherein said card reader device is a merchant terminal that includes loyalty application software for implementing said loyalty program, said merchant terminal performing said elements of transmitting and receiving in real time while said customer is waiting.

10. A method as recited in claim 6 wherein said data file of said smart card includes a file password and a rental indicator, said method further comprising:

reading said rental indicator of said data file to determine that said data file is not accessible by said card reader device; and replacing said file password of said data file with a merchant password received in said second message from said issuer, said merchant password being known to said merchant, whereby said merchant gains access to said data file.

11. A method as recited in claim 6 wherein said smart card includes a plurality of data files that have been preinstalled, said method further comprising:

searching through said data files to find said data file, said data file being available for use by said merchant; and replacing a file password associated with said data file with a password known to said merchant, whereby said merchant gains access to said data file.

12. A method as recited in claim 6 further comprising:

accessing said first data file using said merchant password; and updating data within said data file of said smart card with information relevant to a transaction between said customer and said merchant, whereby said merchant password allows said merchant to implement said loyalty program using said first data file.

* * * * *